United States Patent Office 2,752,334
Patented June 26, 1956

2,752,334

N-SUBSTITUTED LACTOBIONAMIDES

Henry Walton, Islip, N. Y., assignor to National Dairy Research Laboratories, Inc., Oakdale, N. Y., a corporation of Delaware No Drawing. Application March 1, 1952,
Serial No. 274,507

5 Claims. (Cl. 260—211)

This invention relates to N-substituted lactobionamides and to a process for preparing these compounds.

Processes for the preparation of lactobionic acid from lactose are known and have been described in the literature (H. S. Isbell and H. L. Frush, B. S. Jour. Res., 6 (RP 238), 1145 (1931)). The acid can be isolated in the form of the calcium salt (U. S. Patent No. 1,980,996 to Horace S. Isbell, dated November 20, 1934), and from this salt or from a solution of the acid the δ-lactone can be obtained (Isbell, B. S. Jour. Res., 11 (RP 618), 713 (1933)). Heretofore, however, there have been no reports in the literature of the preparation of N-substituted lactobionamides.

The present invention provides a process for the preparation of the N-substituted lactobionamides by reacting the corresponding organic primary or secondary amine with lactobionic acid δ-lactone. The reaction probably proceeds as follows:

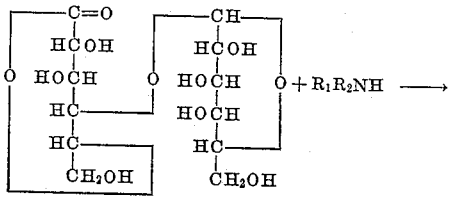

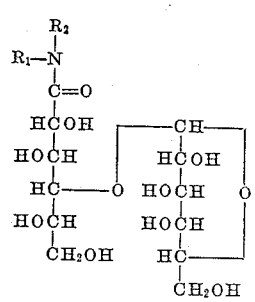

$R_1$ in the above formulas can be an aliphatic, aromatic, mixed aliphatic-aromatic or cycloaliphatic group, and $R_2$ can be hydrogen or an aliphatic, aromatic, mixed aliphatic-aromatic or cycloaliphatic group. $R_1$ and $R_2$ can be the same or different, as desired. There is no critical upper limit on the number of carbron atoms of $R_1$ and $R_2$. $R_1$ and $R_2$ can, for example, be a saturated alkyl group, such as methyl, ethyl, amyl, hexyl, heptyl, nonyl, decyl, undecyl, dodecyl, tridecyl, tetradecyl, pentadecyl, hexadecyl, heptadecyl and octadecyl, an unsaturated aliphatic radical, such as undecenyl, oleyl, linoleyl, linolenyl, propenyl, and heptenyl, to mention a few saturated and unsaturated aliphatic radicals, benzyl and phenyl ethyl, to mention a few mixed aliphatic-aromatic radicals. Phenyl and naphthyl are typical aromatic radicals, and cyclopentyl and cyclohexyl are typical cycloaliphatic radicals.

The reaction proceeds relatively rapidly in the case of aliphatic and aromatic-substituted aliphatic amines. Aromatic and cycloaliphatic amines may react more slowly.

The lactobionamides carrying N-aliphatic substituents and mixed aliphatic-aromatic substituents of lower molecular weight attached to the nitrogen atom can be recrystallized from ethanol, and those carrying aliphatic and mixed aliphatic-aromatic radicals of higher molecular weight, can be recrystallized from methanol.

The above-postulated reaction equation is believed to be highly probable, but the structure of the lactobionamides has not as yet been definitely proved. Thus the above formulas are given as a possible explanation of the course of the reaction, but the invention is not to be bound thereby.

The reaction can be effected by heating the reactants without a solvent in the case of the amines having a higher boiling point. In this event, the reaction can be carried out at temperatures approximating 140° C. or below. However, the use of a solvent and lower temperatures will give better yields with less chance of decomposition in the course of the reaction and therefore a purer product. Alcohols in general are useful, and particularly aliphatic alcohols, glycols, and gycol monoethers, such as methanol, ethanol, isopropanol, ethylene glycol, polyethylene glycol, triethylene glycol, diethylene glycol, diethylene glycol monoethyl ether, ethylene glycol monobutyl ether, ethylene glycol monoethyl ether, ethylene glycol monomethyl ether, diethylene glyco monobutyl ether, and triethyene glycol monomethyl ether. A solvent is usually desirable in the case of amines having a lower boiling point. Reaction temperatures within the range from 65 to 140° C. are preferred.

The following examples illustrate the preparation of these compounds.

EXAMPLES 1 TO 21

Purified lactobionic acid δ-lactone is added to a slight molecular excess of the amine in about 2 to 4 times its weight of methanol (in the case of higher amines) or ethanol (in the case of lower amines), refluxed for ½ to 1½ hours and filtered hot to remove any undissolved material. If the reaction mixture is colored, it can be treated hot with an active decolorizing carbon, such as Norite, and filtered. The solution is then allowed to cool, whereupon the N-substituted lactobionamide crystallizes. The crystalline material is collected on a suction funnel, washed first with isopropanol and then with ethyl ether, and dried.

In most instances, the material so obtained is white and melts within 1 to 2° C. of analytically pure samples prepared following further recrystallization from ethanol or methanol or ethylene glyco monomethyl ether. If the product is impure, however, it can be recrystallized as indicated.

The melting points of a number of N-substituted lactobionamides prepared from primary amines and one secondary amine in accordance with the above procedure are as follows:

| Example No. | $R_1$, No. of Carbon Atoms | $R_1$ | $R_2$ | M. P. | Recrystallized from— |
|---|---|---|---|---|---|
| 1 | 2 | ethyl | Hydrogen | 147–148.5° C | ethanol. |
| 2 | 3 | n-propyl | do | 147–148° C | Do. |
| 3 | 3 | allyl | do | 161–162° C | Do. |
| 4 | 4 | n-butyl | do | 146–147° C | Do. |
| 5 | 5 | n-amyl | do | 133° C | Do. |
| 6 | 6 | n-hexyl | do | 133–135° C | Do. |
| 7 | 7 | n-heptyl | do | 148–149° C | methanol. |
| 8 | 8 | n-octyl | do | 141–143° C | ethanol. |
| 9 | 9 | n-nonyl | do | 148–149° C | methanol. |
| 10 | 10 | n-decyl | do | 127–128° C | Do. |
| 11 | 11 | n-undecyl | do | 143–145° C | Do. |
| 12 | 12 | n-dodecyl | do | 121° C | Do. |
| 13 | 13 | n-tridecyl | do | 147–148.5° C | Do. |
| 14 | 14 | n-tetradecyl | do | 136–137° C | water. |
| 15 | 15 | n-pentadecyl | do | 144–145° C | methanol. |
| 16 | 16 | n-hexadecyl | do | 133° C | Do. |
| 17 | 17 | n-heptadecyl | do | 144–147° C | Do. |
| 18 | 18 | n-octadecyl | do | 131–133° C | Do. |
| 19 | 7 | benzyl | do | 167–168° C | ethanol. |
| 20 | 8 | β-phenylethyl | do | 156–157° C., resolidified, melts again. 167–168° C | methanol. |
| 21 | 6 | n-hexyl | n-hexyl | 141–142° C | ethanol. |

In all cases the analytical values obtained for carbon, hydrogen and nitrogen were within the usual permissible experimental error of 0.30%.

In preparing the above N-substituted lactobionamides, first crop yields of 70 to 75% were obtained of a nearly pure lactobionamide. From the mother liquor, additional crops probably could be obtained.

EXAMPLES 22 AND 23

The above procedure is repeated employing aniline and cyclohexylamine and using ethylene glycol monomethyl ether as the solvent. The mixture is refluxed for ½ to 1½ hours and filtered hot to remove any undissolved material. The reaction proceeds smoothly and the N-phenyl and N-cyclohexyl lactobionamides are obtained by crystallization from the cooled reaction solution. The product can be recrystallized from the same solvent to separate by-products and unreacted material.

The lactobionamides of Examples 1 to 20 are prepared by reaction of lactobionic acid δ-lactone and a primary amine. However, a secondary amine can be substituted with equivalent results, although the reaction may proceed somewhat more slowly and with lower yields. In addition to the dihexylamine of Example 21 secondary amines such as amylmethylamine and octadecylethylamine can be employed, for example.

The lactobionamides of the higher aliphatic amines show marked surface-active properties. N-substituted lactobionamides having one or two aliphatic radicals of 14 to 18 carbon atoms attached to the nitrogen are capable of emulsifying significant amounts of water in n-octane. N-octadecyl lactobionamide shows considerable emulsifying power. Aqueous solutions of N-decyl and N-dodecyl lactobionamides foam strongly when shaken, but appear to have a lower emulsifying power than solutions of the higher lactobionamides. Compounds carrying aliphatic chains of odd numbers of carbon atoms show less emulsifying power than the next higher or lower even numbered aliphatic chain.

The surface-active properties of the lactobionamides were determined by shaking a mixture of 2.0 ml. n-octane, 8.0 ml. water and the indicated amounts of test substances in a glass-stoppered 10 ml. graduated cylinder and then allowing the mixture to stand. The recorded figures are based on the final volume of the upper (oil) layer after several hours standing and five days, respectively.

Table I

EMULSIFICATION OF n-OCTANE AND WATER

| N-Substituent in Lactobionamide | Mgm. Used | After Several Hours | | After 5 Days | |
|---|---|---|---|---|---|
| | | Vol., Upper Layer | Approx. Weight, Percent Water in Oil | Vol., Upper Layer | Approx. Weight, Percent Water in Oil |
| n-decyl | 20 | 2.2 | 15 | 1.9 | 0 |
| n-tridecyl | 10 | [1] 2.1 | 25 | [1] 2.2 | |
| n-tetradecyl [2] | 20 | 2.8 | 60 | [3] 2.3 | |
| n-pentadecyl | 20 | 2.4 | 30 | 2.4 | 30 |
| n-hexadecyl | 20 | [4] 2.7 | 50 | 2.7 | 50 condensate |
| n-octadecyl | 20 | [4] 3.0 | 70 | 3.2 | 70 |
| n-octadecyl | 10 | [4] 3.2 | 70 | 3.1 | 70 |
| n-octadecyl | 5 | [4] 3.1 | 70 | 3.0 | 70 |
| glycerol-α-monostearate | 20 | [4] 2.7 | 50 | [5] 2.4 | |

[1] Plus 0.2 ml. oil.
[2] Contained undissolved material at end of test.
[3] Plus 0.4 ml. oil.
[4] Water phase cloudy.
[5] Plus 0.3 ml. oil.

The lactobionamides were also found to be capable of emulsifying cheese. The test consisted of heating 20 g. of cheese with the emulsifier in a double boiler with hand stirring. The cheese was taken from a single cheddar cheese and was selected because it oiled off when heated without an emulsifier salt.

The following results were noted:

Table II
EMULSIFICATION OF A CHEDDAR CHEESE BY N-SUBSTITUTED LACTOBIONAMIDES

| N-substituent | Admixture in Percent | | | |
| --- | --- | --- | --- | --- |
| | 2.5 | 1.0 | 0.5 | 0.1 |
| n-amyl | + | + | + | |
| n-hexyl | + | + | + | |
| n-octyl | + | + | + | |
| n-decyl | + | + | + | |
| n-dodecyl | + | + | + | |
| n-tetradecyl | + | + | + | + |
| n-hexadecyl | + | + | + | |
| n-octadecyl | + | + | + | + |
| benzyl | + | + | + | |
| β-phenylethyl | + | + | + | |

The + indicates that the lactobionamides successfully prevented oiling off. Where no indication is given, the compound was not tested at that concentration.

The N-substituted lactobionamides of the invention also show antimycotic activity. A number of samples of Sabourand's dextrose broth containing 200, 100, 50, 25 and 13 parts per million of test compound were inoculated with two drops of spore suspension of Penicillium. The tubes were incubated at 30° C. Terminal readings were taken of the extent of growth at 72 hours. The results are reported as the per cent inhibition of growth compared to normal controls.

Table III
EFFECT OF N-SUBSTITUTED LACTOBIONAMIDES ON A PENICILLIUM SPECIES

| N-substituent in Lactobionamide | Percent Inhibition (Parts per Million) | | | | |
| --- | --- | --- | --- | --- | --- |
| | 200 | 100 | 50 | 25 | 13 |
| n-dodecyl | 100 | 60 | 60 | 30 | |
| Do | | | 100 | | |
| n-tetradecyl | 100 | 100 | 100 | 100 | 60 |
| Do | | | | | 100 |
| n-pentadecyl | 0 | | | | |
| n-hexadecyl | 60 | 60 | 60 | 60 | |
| n-heptadecyl | 0 | | | | 60 |
| n-octadecyl | | | | | 100 |
| lactobionic acid δ-lactone | 0 | | | | |

The above results show the N-substituted lactobionamides to be effective antimycotic agents, in contrast to lactobionic acid δ-lactone. N-substituted unsaturated aliphatic radicals also are capable of conferring antimycotic properties upon the lactobionic acid radical.

It is evident that many variations can be made in the above invention without departing from the essentials thereof. For example, a wide variety of solvents other than the alcohols referred to could be employed in carrying out the reaction between lactobionic acid δ-lactone and the amines. The process of the invention is applicable to the reaction of both primary and secondary amines with lactobionic acid δ-lactone, and thus N-monosubstituted and N-disubstituted lactobionamides come within the scope of the invention. Further, those skilled in the art will know to what uses the N-substituted lactobionamides can be put in addition to those suggested without the exercise of invention. Accordingly, the invention is not to be limited except as set forth in the claims.

I claim:

1. As a new compound, an N-substituted lactobionamide having the general formula

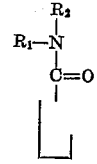

where $R_1$ and $R_2$ are selected from the group consisting of hydrogen, aliphatic, aromatic, mixed aliphatic-aromatic and cycloaliphatic groups, of which no more than one of $R_1$ and $R_2$ is hydrogen, and

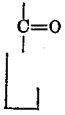

stands for the lactobionic acid molecule.

2. As new compounds, N-substituted lactobionamides having the general formula

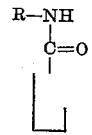

where R is an aliphatic radical having from twelve to eighteen carbon atoms, and

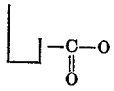

represents the lactobionyl group.

3. An N-substituted lactobionamide in accordance with claim 2, in which R is a tetradecyl radical.

4. An N-substituted lactobionamide in accordance with claim 2, in which R is an octadecyl radical.

5. An N-substituted lactobionamide in accordance with claim 2, in which R is a dodecyl radical.

References Cited in the file of this patent

UNITED STATES PATENTS 1,901,565    Pasternack et al.    Mar. 14, 1933

OTHER REFERENCES

Chem. Abst., v. 42, pages 1983–4 (1948), citing Stodola et al., J. Biol. Chem., v. 171, pages 213–21 (1947).

Chem. Abst. v. 44, page 2455e (1950).